United States Patent [19]

Pitman

[11] 4,313,455
[45] Feb. 2, 1982

[54] FLUID ROUTING DEVICE

[75] Inventor: Donald G. Pitman, Glendale, Ariz.

[73] Assignee: Lester R. Mathews, Phoenix, Ariz.

[21] Appl. No.: 94,393

[22] Filed: Nov. 14, 1979

[51] Int. Cl.³ .......................................... F16K 11/14
[52] U.S. Cl. ................................ 137/119; 137/624.14; 137/627
[58] Field of Search .................. 137/627, 119, 624.14, 137/624.18, 624.2, 625.11

[56] References Cited

U.S. PATENT DOCUMENTS

| | | | |
|---|---|---|---|
| 3,405,733 | 10/1968 | Hansen | 137/624.14 |
| 3,476,150 | 11/1969 | Lowenthal | 137/625.11 |
| 3,779,269 | 12/1973 | Gould | 137/624.14 |
| 4,077,424 | 3/1978 | Ehret | 137/624.14 X |
| 4,114,206 | 9/1978 | Franc | 4/172.17 |

Primary Examiner—Alan Cohan
Attorney, Agent, or Firm—Charles E. Cates

[57] ABSTRACT

A fluid routing device has a sealed self-contained body which includes all of the working parts of such a device is combined with a base plate having discharge ports which register with outlets in the sealed body which are controlled by valves within that body, means for sealingly, but releasably, attaching the base plate to the body and the body to the conduit to a source of fluid under pressure are also included. The disclosure also teaches a method of servicing devices in a swimming pool system including the steps of providing in the device a sealed self-contained releasable body portion containing the moving parts, removing a malfunctioning sealed body portion and replacing it with a new functioning sealed body portion.

6 Claims, 9 Drawing Figures

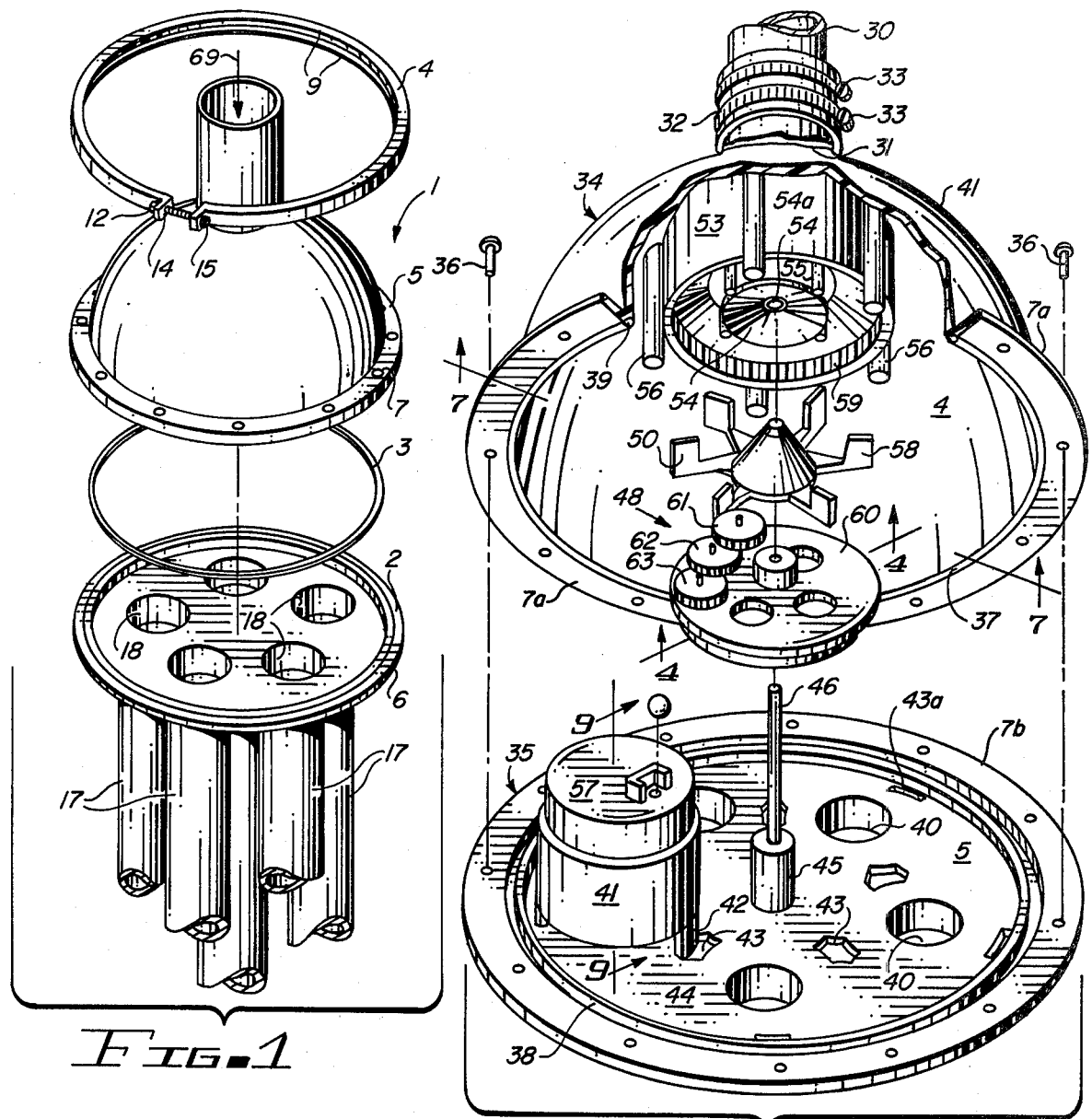
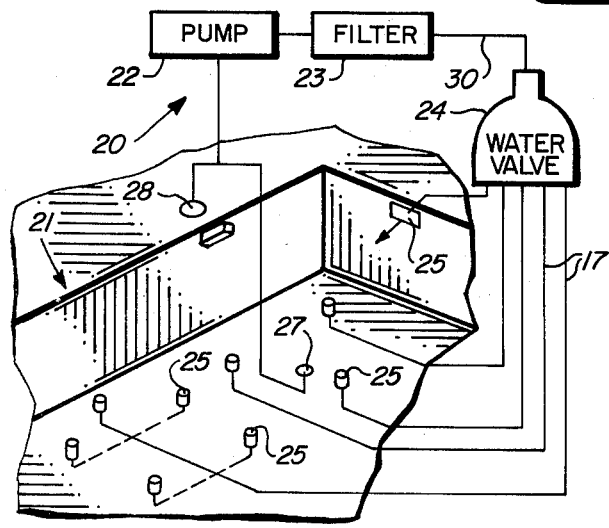
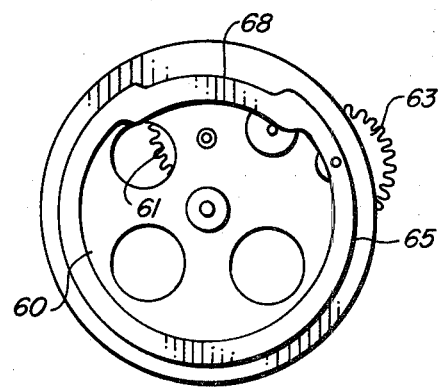

FLUID ROUTING DEVICE

BACKGROUND OF THE INVENTION

This invention relates to fluid control valves of the type that provides distribution of a fluid from a single source sequentially to a plurality of outlets. In its more particular embodiments it relates to such a valve adapted to incorporation into a swimming pool water circulation system which circulates water from the pool through a filter and back to the swimming pool discharging it through a plurality of outlets whose purpose is to agitate the water and sediments on the walls and bottom of the pool to put the latter into suspension so that they may be more effectively filtered.

Valves known to the prior art which function as swimming pool water distributors are such as may be found in the United States patents to K. W. Hanson U.S. Pat. No. 3,405,733 and Henry D. Gould U.S. Pat. No. 3,779,629. A problem inherent in the prior art devices is that such valves are difficult to repair, require substantial time for service representatives to service and, consequently, are expensive to repair. The problem is further compounded by customer dissatisfaction with down time which occurs at an inconvenient time or at a busy season when the service representatives can not get to the repairs on a short notice. Moreover, the cost of doing customer repairs and warranty work on valves under these conditions is a considerable cost factor which necessarily must be built into the sales price of the valve itself.

Accordingly, there is a felt need for an improved valve which can be serviced with less time expended by service personnel in the field and for a method of doing such service that will minimize the cost of expensive field time and, just as importantly, minimize the loss of use and consequent annoyance to the owner of the valve.

Accordingly, I have devised a method of repairing such valves and an improvement to such valves which will solve the problems alluded to and meet the felt need for such solution.

BRIEF SUMMARY OF THE INVENTION

I have devised a fluid routing device and method of servicing such a device as hereafter explained. The apparatus has a hollow body including at least two exterior parts comprising upper and lower segments joined together to make a sealed, self-contained, unitary body. The body has means for the admission of fluid, such as in a swimming pool water distribution valve; a plurality of valve means having open and closed positions relative the outward passage of the fluid involved; means responsive to the flow of fluid into the inlet means for sequentially opening and closing the valves; a base plate adapted to be attached to the lower segment, which plate has a plurality of outlet means registering with and controlled by the valve means; means for releasably attaching the body to the base plate; and means for releasably attaching the body to a source of fluid.

Preferably, the body of the device will have a peripheral flange defining a diameter equal to the diameter of the base plate and the two will be attached by means of a clamp which engages and compresses their perimeters together. Conveniently, the clamp will be adapted to quick release, for example, a band whose cross section appears as a "C" the legs of which encompass the flanges of the base plate and body and which is tightened upon the base plate and body in sealing relationship by any suitable means.

Ideally, in a swimming pool water routing device the means for sequentially opening and closing the valve would include a drive train having an impeller responsive to the force of water entering the inlet means; a gear train responsive to the impeller; axially disposed, rotatable cam means responsive to the gear train; and a set of valves adapted to open and close sequentially responsive to operation of the cam means.

In a broader sense the invention includes a swimming pool system which has the fluid distributing valve in any of the embodiments set forth in combination with a pool of water; a filter; a pump; a plurality of means for discharging water into the pool, such as pool surface scrubbing heads which communicate with the conduit means; and a recirculating water conduit loop connecting the pool pump, filter, valve and associated discharge means.

In connection therewith I have devised the method of servicing a swimming pool water distributor device comprising the steps of: providing in the device a sealed, self-contained, releasable body portion containing the moving parts in which malfunction might occur; removing the malfunctioning sealed body portion; and replacing it with a new functioning body portion; and, optionally, the additional step of sending the malfunctioning portion to a central repair facility for repair.

DETAILED DESCRIPTION OF THE PREFERRED EMBODIMENT

A further and more complete understanding of the nature of the invention may be had from a consideration of the detailed description of the presently preferred embodiment and the attached drawings, in which:

FIG. 1 is a perspective view, partly exploded, of the water routing device of this invention;

FIG. 2 is a schematic diagram of a swimming pool system embodying the invention;

FIG. 3 is an exploded view of the body of the device, enlarged from the view of FIG. 1;

FIG. 4 is an enlarged bottom plan view, in isolation, of the cam mechanism and part of the gear train;

Figure 5:
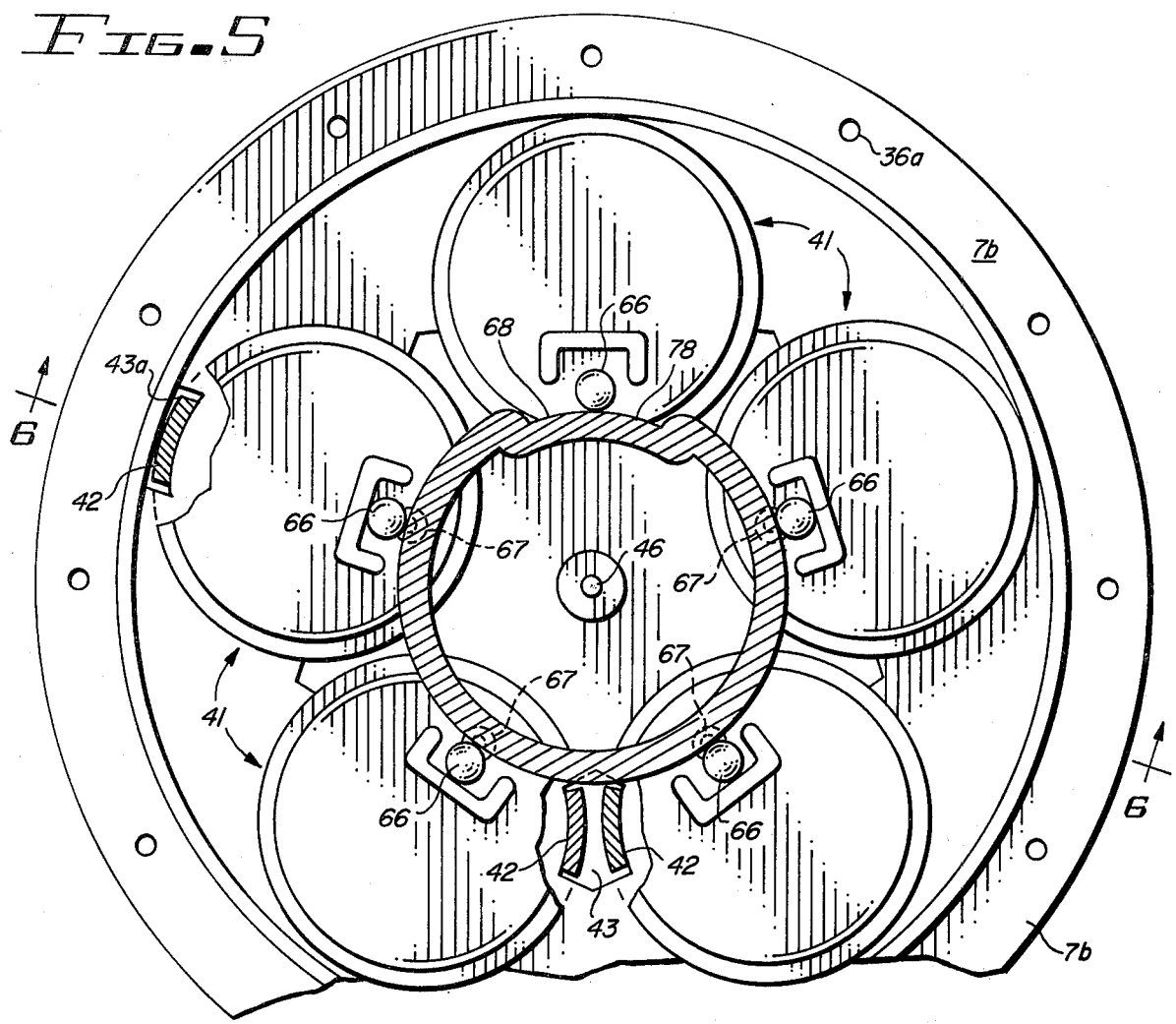
FIG. 5 is an enlarged plan view of the lower segment of the body showing details of the arrangement of the cam and individual valve arrangement.

Referring now to FIG. 1, in which a presently preferred embodiment of the invention is depicted, the device 24 has a body 1 which will be described in greater detail within, a base plate 2, an O-ring 3, and a clamp 4 whose function is to encompass the perimeters 5, 6 of the body and base plate respectively in the legs 9 of the clamp 4. The clamp 4 is tightened by means of bolt 12 in cooperation with tabs 14, 15. Tab 14 is provided with a relief bore for sliding reception of the bolt, whereas tab 15 is provided with a tapped bore whose threads mate with the threads of bolt 12. When the clamp is tightened an effectively fluid-tight seal is achieved in the body 1 and the base plate 2 by O-ring 3 compressed between the two.

Conduits 17 communicate with and are cemented to outlet means 18 in base plate 2 and water discharge means disposed in the floor and/or walls of a pool.

The pool system can be visualized with reference to FIG. 2 in which a recirculating water line 20 connects the pool 21 with the pump 22, filter 23 and water routing device 24, which in turn has conduits 17 which lead to water discharge devices 25. Water is removed from the pool through main drain 27 and through skimmer 28.

In FIG. 3 the body 1 is shown in exploded perspective and a means for releasably attaching the body to a source of fluid is also illustrated. The segment of the recirculating water line which leads to the water routing device 24 is indicated at 30. It is releasably attached to the neck 31 of the body 1 by elastomeric sleeve sealingly tightened thereon by clamps 33.

The usual prior art device was connected by cementing the loop segment 30 to the distributing device. This change in cooperation with the self-contained, sealed body feature, and means for releasably attaching the body to the base plate, permit the removal and rapid replacement of the sealed body unit.

The body has an upper segment 34 and a lower segment 35 joined together by rivets 36 to seal the unit. A water-tight seal between the upper and lower segment is affected by use of O-ring 37 disposed in a suitable receptacle defined by groove 38 and shoulder 39.

Lower segment 35 is provided with outlet ports 40 which are controlled by valves 41. Each valve has legs 42 which are confined in pits 43. Each pit 43 receives one leg each from adjoining valves and pit 43a receives one leg from one valve. In FIG. 3 only one valve is shown in place, although it is to be understood that a valve controls each port 40. The leg supports the body of the valve above the floor 44 of segment 5 for a reason which will be explained presently with reference to the details of FIG. 9. Also supported by the floor 44 is pedestal 45 which in turn supports standard 46 upon which is mounted a gear reduction train 48, impeller 50 and cam 60.

Figure 7:
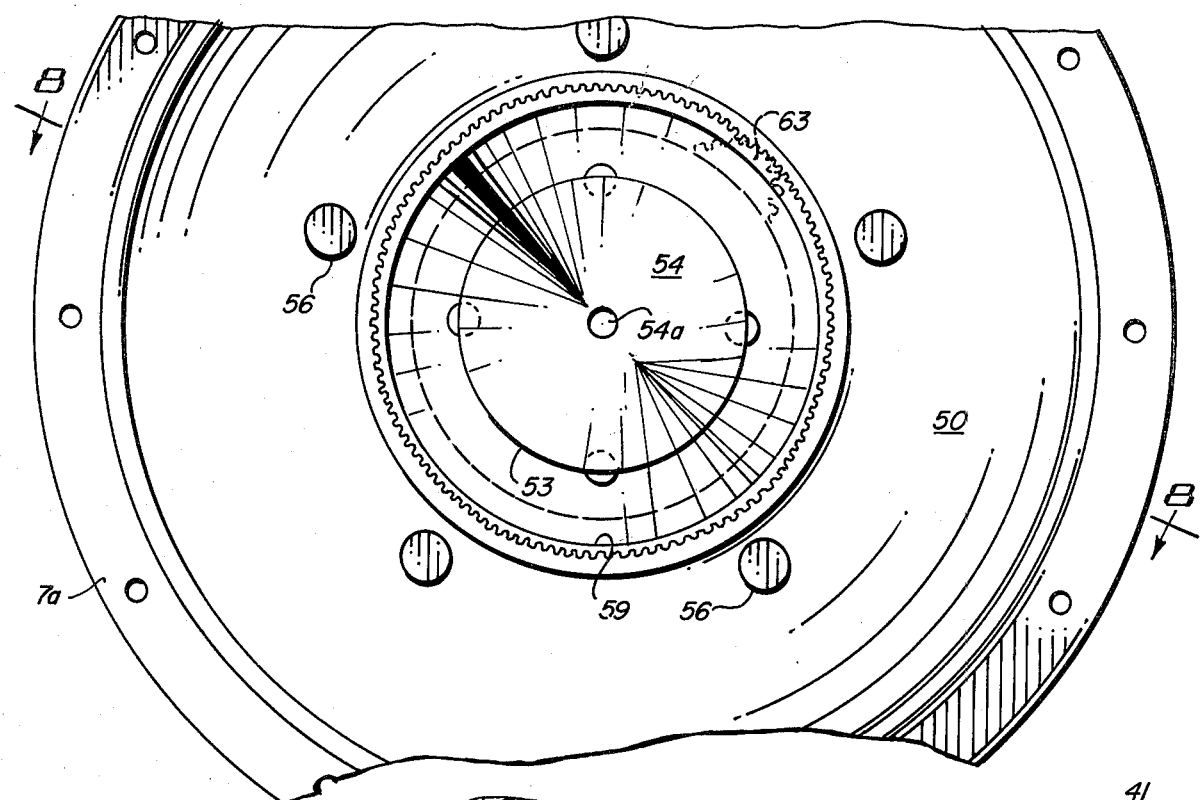
FIG. 7 is a bottom plan view of the upper segment of the body.
Figure 8:
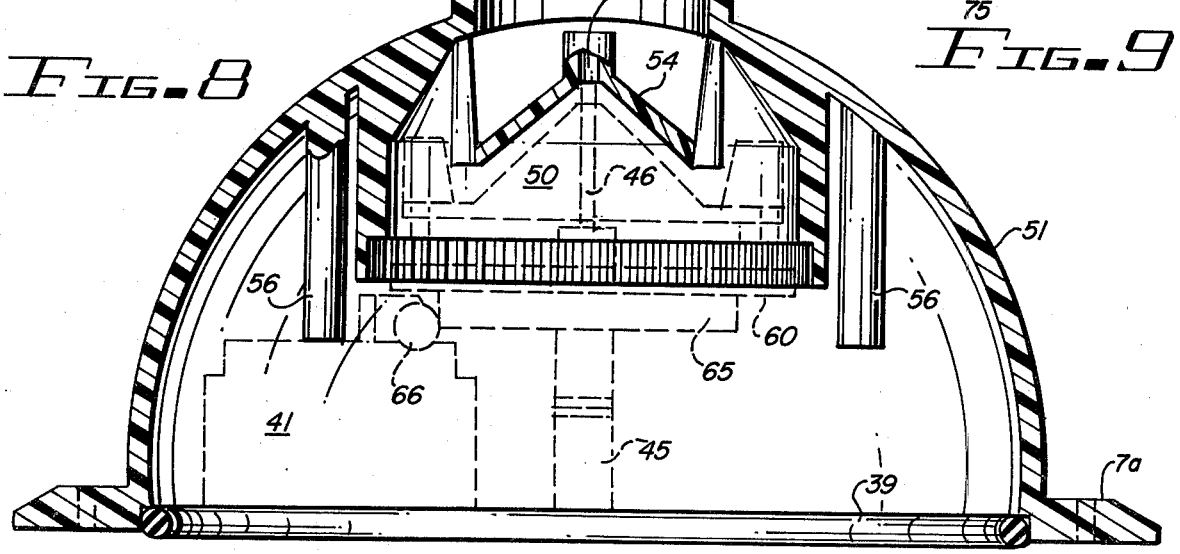
FIG. 8 is an elevation view, partly in cross section, of the upper segment of the body and certain internal parts, with the mechanism shown in phantom outline.

FIGS. 7 and 8, in addition to FIG. 1, show details of the upper segment's external parts: the neck 31, bell 51 and flange 7a. Flange 7a mates with flange 7b of lower segment 35. Internally, an intake chamber 53 is provided as an extension of neck 31. Within the intake chamber 53 is a dispersion shield 54 which has an axial bore 54a which receives standard 46 when the two segments are put together, thus providing firm axial support for impeller, gear train and cam on standard 46. Shield 54 is supported within the chamber 53 by posts 55 which depend from bell 51. The dispersion shield serves the function of causing incoming water to impinge upon the vanes 58 of the impeller 50. Also depending from the roof of the bell is one support post 56 for each valve 41. The bottoms of the support posts bear on the tops 57 of valves 41 to retain them in place.

Around the inside perimeter of intake chamber 53 there is provided a gear ring 59 adapted to mate with the teeth of gear 63. The function and operation of the gear reduction train are well known in the art and will not be elaborated. Briefly, however, the rapid rotation of the impeller 50 is reduced by the gear train 48 to a desired slower rate of rotation in the cam 60.

Figure 6:
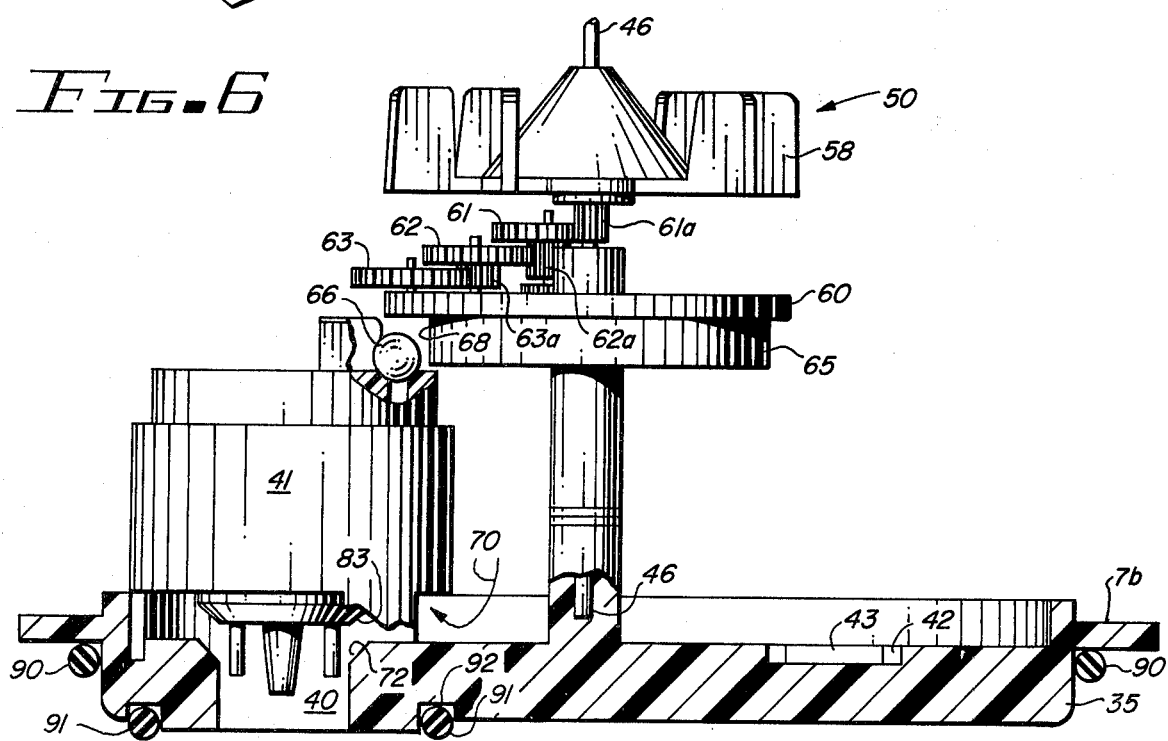
FIG. 6 is an elevation view of the drive train including impeller, intermediate gears and cam, and the relationship therewith to the valve apparatus.

As better seen in FIG. 6, gear 61 meshes with gear 61a, gear 62 meshes with gear 62a and gear 63 meshes with gear 63a. Gear 61a rotates responsive to the rotation of impeller 50 which is transmitted through the succession of gears, at a desired reduced angular velocity, to gear 63. Gear 63 meshes with gear ring 59 causing gear 63 to travel about the circumference of gear ring 59 carrying its point of rotation at the perimeter of cam 60 with it. This necessarily causes the cam to turn at whatever rate has been designed into the gear reduction train.

FIGS. 4, 5, 6 and 9 show how the cam operates on the valves. There is a valve 41 controlling each port 40. As the cam 60 rotates, the cam surface 65 displaces all but one of the balls 66 from associated pressure ports 67. A portion 68 of the cam surface is relieved such that at any given time it permits only one ball to cover its pressure port. When pressure port 67 is open the water pressure in the direction of arrow 69 snaps the valve 41 to the closed position. When relieved portion 68 passes a ball 66 that ball is permitted to close pressure port 67. Then the pressure of the water within the body 1 in the direction of arrow 70 will crisply move the valve plug 71 away from its seat 72. As that occurs the excess water in chamber 74 exhausts through relief vent 75 (see FIG. 9). When portion 78 of the cam passes the valve under consideration, ball 66 will be forced off its seat on pressure port 67. Then plug 71 will snap back in place over seat 72 and thereby effectively close port 40. Thus, valves 41 open and shut sequentially as relieved cam portion 78 passes from one ball 66 to another.

To provide a water tight seal between lower segment 35 and base plate 2, O-ring 90 is placed around the perimeter of plate 2 and O-rings 91 are disposed in grooves 92 around each port 40.

Figure 9:
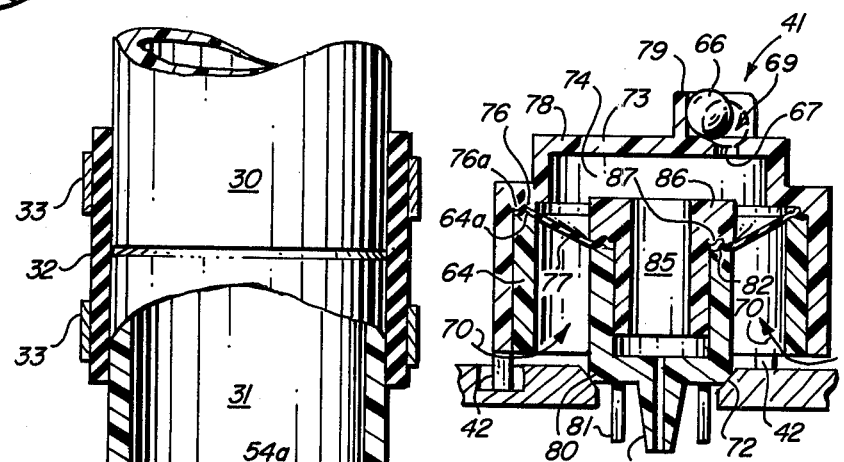
FIG. 9 is an elevation view, in cross section, of the valve member shown in FIG. 6.

As shown in FIG. 9 the parts of the valve 41 are the casing 73, a hollow cylindrical member, which is provided with a pressure port 67 in the cap 78. A turret 79 surrounds the port 67 on three sides, providing containment of ball 66 in cooperation with the cam surface 65. The casing 73 is supported above the floor of lower segment 35 by legs 80. This leaves openings between the legs for passage of water in the direction of arrow 70.

Within casing 73 is a hollow sleeve 64. An annular crown 64a on the end of sleeve 64 mates with annular groove 76a on shoulder 76 of casing 73. Sleeve 64 is inserted with a press fit into casing 73 and the outer edges of the diaphragm 77 are engaged by crown 64a and groove 76a.

To provide dependable crisp off and on valve action, plug 80 is provided with a face 83 that is substantially narrower than seat 72. Unexpectedly, the performance of this combination is markedly superior to a prior art device wherein the counterparts to face 83 and seat 72 are equal in width.

Inside the casing 73 is a valve plug 80 in the shape of a hollow cylinder with one closed end at which a relief vent 75 and guide members 81 are provided. The edges of the open end carries an annular boss 82 which mates with the channel 87 in the flange 86 of the hollow plug insert 85 fitted into plug 80.

In connection with the invention of the device I have devised a method for maintaining operation of the water routing device without causing substantial loss of use to the owner of the pool system. The body 1 contains all of the working parts of the water routing device and is manufactured as a sealed unit which, in the preferred embodiment, can not be opened by the pool system owner without special tools. If there is a malfunction of the working parts of the device, the serviceman who is called to make the repair need not spend the time on the site to make the repairs. All that he does on site is disconnect the body 1 from base plate 2 by releasing the clamp 4 which is a simple matter of unscrewing bolt 12, and by similarly unbolting clamps 33 to permit sleeve 32 to be moved upward on conduit 30, thus releasing neck 31 of body 1. A new factory-sealed body is put in place of the old and the sleeve 32 and clamps 33 and 4 are replaced and tightened. This takes a matter of minutes and the pool system is back in operation again. The disabled body is then sent back to the factory or a central repair facility where it can be inspected for defects and the condition of the mechanism otherwise examined in scientific investigation.

Although the teachings of this invention have been set forth in the single embodiment, it will be appreciated by those skilled in the art that various modifications and alternative embodiments may be made without departing from the spirit and scope of the invention.

What I claim is:

1. In a fluid routing device including:
   a. a hollow body including at least two exterior parts comprising upper and lower segments joined together to make a self-contained, unitary body, and having
      (1) inlet means for the admission of fluid;
      (2) a plurality of valve means having open and closed positions relative the outward passage of fluid;
      (3) means responsive to the flow of fluid for sequentially opening and closing said valves;
   b. a base plate adapted to attachment to said lower segment and having a plurality of outlet means registering with and controlled by said valve means; and
   c. means for releasably attaching said body to said base plate, each of said plurality of valve means comprising a casing, a diaphragm disposed within said casing, a valve plug suspended within said casing by means of said diaphragm, a port in said lower segment having a valve seat, said plug having a valve face sized and adapted to register with and seal on a portion of said seat, whereby tolerance is increased and positive seating enhanced.

2. The fluid routing device of claim 1 with the addition of means for releasably attaching said body to a source of fluid;

3. The fluid routing device of claim 2 plus means for attaching said base plate to a plurality of conduits communicating with said outlet means.

4. The fluid routing device of claim 1 wherein said body has a peripheral flange defining a diameter equal to the diameter of said base plate and said body is attached to said base plate by means of a clamp engaging and compressing together the perimeters of said body and said plate.

5. The fluid routing device of claim 1 wherein said means for sequentially opening and closing said valve means is responsive to the flow of fluid into said body.

6. The fluid routing device of claim 1 wherein said means for sequentially opening and closing said valves is a drive train including an impeller in said inlet means, a gear train responsive to said impeller, axially disposed rotatable cam means responsive to said gear train, and a set of valves adapted to open and close sequentially responsive to said cam means.

* * * * *